United States Patent
Kirkham et al.

(10) Patent No.: US 9,619,220 B2
(45) Date of Patent: Apr. 11, 2017

(54) RECOMMENDING NATIVE APPLICATIONS

(71) Applicant: Google Inc., Mountain View, CA (US)

(72) Inventors: Stephen Kirkham, San Francisco, CA (US); Brandon Bilinski, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/017,819

(22) Filed: Feb. 8, 2016

(65) Prior Publication Data
US 2016/0154641 A1    Jun. 2, 2016

Related U.S. Application Data

(63) Continuation of application No. 13/588,824, filed on Aug. 17, 2012, now Pat. No. 9,280,789.

(51) Int. Cl.
G06N 5/00 (2006.01)
G06F 1/00 (2006.01)
G06F 9/445 (2006.01)
G06Q 30/06 (2012.01)
H04L 29/08 (2006.01)

(52) U.S. Cl.
CPC .......... *G06F 8/61* (2013.01); *G06Q 30/0631* (2013.01); *H04L 67/34* (2013.01)

(58) Field of Classification Search
CPC ............ G06N 5/02; G06N 5/04; G06N 5/022; G06Q 10/00
See application file for complete search history.

(56) References Cited

U.S. PATENT DOCUMENTS

| 7,072,886 B2 | 7/2006 | Salmenkaita et al. |
| 8,175,989 B1 | 5/2012 | Gopinath et al. |
| 8,230,016 B1 | 7/2012 | Pattan et al. |

(Continued)

FOREIGN PATENT DOCUMENTS

| WO | 2012/154838 | 11/2012 |
| WO | 2012/154843 | 11/2012 |
| WO | 2013/050649 | 4/2013 |

OTHER PUBLICATIONS

International Search Report and Written Opinion in International Application No. PCT/US13/74406, mailed Oct. 9, 2014, 11 pages.

(Continued)

*Primary Examiner* — Stanley K Hill
*Assistant Examiner* — Kalpana Bharadwaj
(74) *Attorney, Agent, or Firm* — Fish & Richardson P.C.

(57) ABSTRACT

In one implementation, a computer-implemented method includes accessing, by a computer system, information that describes use of one or more computer-based services by a particular user from one or more computing devices that are associated with the particular user; identifying one or more native applications that are associated with the one or more services, wherein the one or more native applications are configured to be installed and executed by one or more types of mobile computing devices; determining whether to recommend the one or more native applications based on the information and one or more threshold levels of use of the one or more computer-based services; and providing, based on the determining, a recommendation that is associated with the particular user and that identifies at least one of the one or more native applications.

20 Claims, 7 Drawing Sheets

(56) References Cited

U.S. PATENT DOCUMENTS

| | | | |
|---|---|---|---|
| 8,239,918 | B1 | 8/2012 | Cohen |
| 8,566,173 | B2 | 10/2013 | Mahaniok et al. |
| 8,832,817 | B2 | 9/2014 | Cohen |
| 2002/0062247 | A1 | 5/2002 | Allen |
| 2004/0043758 | A1 | 3/2004 | Sorvari et al. |
| 2005/0149428 | A1 | 7/2005 | Gooch et al. |
| 2007/0028266 | A1 | 2/2007 | Trajkovic et al. |
| 2008/0126176 | A1 | 5/2008 | Iguchi |
| 2008/0154738 | A1 | 6/2008 | Jain et al. |
| 2008/0235680 | A1 | 9/2008 | Strauss et al. |
| 2008/0243632 | A1 | 10/2008 | Kane et al. |
| 2009/0018894 | A1 | 1/2009 | Zamani et al. |
| 2009/0163183 | A1 | 6/2009 | O'Donoghue et al. |
| 2009/0313086 | A1 | 12/2009 | Lee et al. |
| 2011/0077951 | A1 | 3/2011 | Tullis |
| 2011/0208801 | A1 | 8/2011 | Thorkelsson et al. |
| 2011/0225291 | A1 | 9/2011 | Dobroth et al. |
| 2012/0010996 | A1 | 1/2012 | Horvitz et al. |
| 2012/0072312 | A1 | 3/2012 | Lange et al. |
| 2012/0084292 | A1* | 4/2012 | Liang ............... G06F 17/30899 707/741 |
| 2012/0096435 | A1 | 4/2012 | Manolescu et al. |
| 2012/0124028 | A1 | 5/2012 | Tullis et al. |
| 2012/0254097 | A1 | 10/2012 | Flinn et al. |
| 2012/0284247 | A1 | 11/2012 | Jiang |
| 2012/0284256 | A1 | 11/2012 | Mahajan et al. |
| 2012/0316955 | A1 | 12/2012 | Panguluri et al. |
| 2013/0014040 | A1* | 1/2013 | Jagannathan .......... G06Q 50/01 715/765 |
| 2013/0139271 | A1 | 5/2013 | Arrelid et al. |
| 2013/0290369 | A1* | 10/2013 | Sayers .................... H04L 67/22 707/769 |
| 2014/0052683 | A1 | 2/2014 | Kirkham et al. |
| 2014/0059213 | A1 | 2/2014 | Ollikainen et al. |
| 2014/0172911 | A1 | 6/2014 | Cohen et al. |
| 2014/0250105 | A1 | 9/2014 | Shankar |

OTHER PUBLICATIONS

'Apple Support' [online]. "Genius for iPod and iPhone," 2010, [retrieved on May 16, 2012]. Retrieved from the Internet: URL <support.apple.com/kb/HT2978>. 3 pages.

'Google Mobile Help' [online]. "Gmail 'app' shortcut," 2012, [retrieved on May 16, 2012]. Retrieved from the Internet: URL <support.google.com/mobile/bin/answer.py?hl=en&answer=31238>. 1 page.

Hudson, C. 'Insidemobileapps' [online]. "Mobile App Discovery is a Developer Problem, Not a Consumer Problem," 2011, [retrieved on Apr. 5, 2012]. Retrieved from the Internet: URL <www.insidemobileapps.com/2011/06/27/mobile-app-discovery/>. 3 pages.

Mahmoud and Popowicz. "Toward a Framework for the Discovery and Acquisition of Mobile Applications," 2010 Ninth International Conference on Mobile Business/2010 Ninth Global Mobility Roundtable, *IEEE Computer Society*, 2010, pp. 58-65.

'MaxaBlog' [online]. "Mobile apps choices: Native Apps vs Web Apps," 2011, [retrieved on Apr. 5, 2012]. Retrieved from the Internet: URL <mkblog.exadel.com/2011/04/mobile-apps-choices-native-apps-vs-web-apps/>. 8 pages.

Metcalfe, J. 'itsmsolutions' [online]. "How to Select and Implement the Right CMDB," 2007, [retrieved on Apr. 5, 2012]. Retrieved from the Internet: URL <www.itsmsolutions.com/newsletters/DITYvol3iss16.htm>. 7 pages.

Nash, S. 'Ignitemybrand' [online]. "Web apps versus mobile app—which is right for my business?," 2011, [retrieved on Apr. 5, 2012]. Retrieved from the Internet: URL<www.ignitemybrand.com.au/blog/web-apps-versus-mobile-apps.php>. 2 pages.

'Pandawhale' [online]. "What's so great about mobile apps? Not every service needs one," 2011, [retrieved on May 16, 2012]. Retrieved from the Internet: URL <pandawhale.com/convo/230/whats-so-great-about-mobile-apps-not-every-service-needs-one>. 4 pages.

Shepard, L. 'FacebookDevelopers' [online]. "Bringing Social App Discovery to Mobile-Facebook Developers," 2011, [retrieved on Apr. 5, 2012]. Retrieved from the Internet: URL <developers.facebook.com/blog/post/575/>. 3 pages.

Tofel, K. 'gigaom' [online]. "HTML5 key to Facebook's mobile app discovery, engagement," 2011, [retrieved on Apr. 5, 2012]. Retrieved from the Internet: URL <gigaom.com/mobile/html5-key-to-facebooks-mobile-app-discovery-engagement/>. 11 pages.

Tseng, B. 'Benjamintseng' [online]. "Web vs. native," 2011, [retrieved on Apr. 5, 2012 ]. Retrieved from the Internet: URL <www.benjamintseng.com/2011/09/web-vs-native/>. 10 pages.

Vo and Torabi. "A Framework for Over the Air Provider-initiated Software Deployment on Mobile Devices," 19th Australian Conference on Software Engineering, *IEEE Computer Society*, 2008, pp. 633-638.

Weber, R. 'Clickz' [online]. "Tips on How to Get Top iPhone Apps," 2010, [retrieved on Apr. 5, 2012]. Retrieved from the Internet: URL <www.clickz.com/clickz/column/1721811/tips-how-get-top-iphone-apps>. 14 pages.

'Weblog-CenriqueOrtiz' [online]. "Mobile Apps in 2009: Local/Native, Mobile Web, App Stores," 2009, [retrieved on Apr. 5, 2012]. Retrieved from the Internet: URL <weblog.cenriqueortiz.com/mobility/2009/01/02/mobile-apps-in-2009-localnative-mobile-web-app-stores/>. 4 pages.

Yan and Chen. "AppJoy: Personalized Mobile Application Discovery," MobiSys'11, Bethesda, Maryland, 2011, 14 pages.

International Search Report and Written Opinion in International Application No. PCT/US2013/054922, dated Dec. 6, 2013, 12 pages.

Parparita, M., "There's a Web App for That," Up to Down, Jul. 29, 2011 [retrieved on Sep. 17, 2015] retrieved from the Internet: URL<http://theres-web-app.en.uptodown.com/>, (4 pages).

International Search Report and Written Opinion mailed Sep. 26, 2014 in Application No. PCT/US2014/020141, 12 pages.

SSLShopper website (Public Key Infrastructure (PKI) Overview Page): https://www.sslshopper.com/public-key-infrastructure-pki-overview.html, 2 pages.

Microsoft Tech Net website (Certification Authority Trust Model Page): https://technet.microsoft.com/en-us/library/cc962065.aspx, 7 pages.

Microsoft website (Public Key Infrastructure Page): https://msdn.microsoft.com/enus/library/windows/desktop/bb427432(v=vs.85).aspx, 3 pages.

Oracle Security Overview 10g Release 1 (10.1) website (The Public Key Infrastructure Approach to Security Page): http://docs.oracle.com/cd/B12037_01/network.101/b10777/pki.htm, 7 pages.

WhatIsMyIPAddress website (What is a hostname? Page): http://whatismyipaddress.com/hostname, 4 pages.

OmniSecu website (Fully Qualified Domain Name (FQDN) and Partially Qualified Domain Name (POON) Page): http://www.omnisecu.com/tcpip/fully-qualified-domain-name-fqdn-and-partially-qualified-domain-name-pqdn.php, 3 pages.

* cited by examiner

RECOMMENDING NATIVE APPLICATIONS

TECHNICAL FIELD

The present disclosure relates to the identification and notification/distribution of relevant mobile application software to users of mobile computing devices.

BACKGROUND

Mobile computing devices, such as smartphones, have advanced greatly in sophistication over the last few years. Many mobile devices can now have applications loaded onto them from third parties, such as applications to permit a user to read a particular newspaper, to play games, and to perform various business functions.

Mobile applications can be classified into at least two groups or types: native applications and web applications. Web applications generally run as part of a web browser that is separately loaded onto a computing device, whereas native applications are executable apart from a web browser. Web applications may be easy to code and to use, while native application may provide a richer experience that is not constrained by limits of HTML coding or the particular browser that may be loaded on a device.

SUMMARY

This document discusses systems and techniques for identifying native applications that are likely to be of interest to users, and providing opportunities for users to acquire the identified native applications on their mobile computing devices. For example, a computer system can identify interests of a particular mobile device user based on a variety of information that may indicate the user would be interested in one or more native applications, such as information identifying the user's use of web-based services (for which there may exist an associated native application), the user's web browsing history, browser bookmarks set by the user, and/or use of native applications by the particular user's acquaintances (e.g., social network friends). Using interests identified for a user, information identifying particular native applications that are consistent with the user's identified interests can be provided to the user in a variety of ways, such as through a push notification that is displayed on the mobile computing device, automatic installation of the particular native applications on the mobile computing device, and/or identification of the particular native applications in a portion of an application store that provides application recommendations.

In one implementation, a computer-implemented method includes accessing, by a computer system, information that describes use of one or more computer-based services by a particular user from one or more computing devices that are associated with the particular user; identifying, by the computer system, one or more native applications that are associated with the one or more services, wherein the one or more native applications are configured to be installed and executed by one or more types of mobile computing devices; determining, by the computer system, whether to recommend the one or more native applications based on the information and one or more threshold levels of use of the one or more computer-based services; and providing, by the computer system based on the determining, a recommendation that is associated with the particular user and that identifies at least one of the one or more native applications for installation on a particular mobile computing device that is associated with the particular user.

In another implementation, a computer-implemented method includes accessing, by a computer system, social network information that identifies a plurality of users who have at least a threshold acquaintance relationship on one or more social networks with a particular user; identifying, by the computer system, one or more native applications that are i) installed on mobile computing devices that are associated with the plurality of users and ii) not installed on a particular mobile computing device that is associated with the particular user; determining whether to recommend the one or more native applications based on a frequency of installation or use of the one or more native applications on the mobile computing devices that are associated with the plurality users; and providing, by the computer system based on the determining, a recommendation that is associated with the particular user and that identifies at least one of the one or more native applications for installation on the particular mobile computing device.

In another implementation, a computer system for providing recommendations for native mobile applications includes a data collection system that is programmed to access information that describes use of one or more computer-based services by a particular user from one or more computing devices that are associated with the particular user; a native application discovery system that is programmed to identify one or more native applications that are associated with the one or more services, wherein the one or more native applications are configured to be installed and executed by one or more types of mobile computing devices; a native application selection system that is programmed to determine whether to recommend the one or more native applications based on the information and one or more threshold levels of use of the one or more computer-based services; and a recommendation unit that is programmed to provide, based on the determination by the native application selection system, a recommendation that is associated with the particular user and that identifies at least one of the one or more native applications for installation on a particular mobile computing device that is associated with the particular user.

In certain implementations, such systems and techniques may provide one or more benefits. For example, a user who has used a particular web service may be identified, and then may be presented with an opportunity to download a native app associated with the web service. The provider of the web service can benefit from improved or more frequent user access. Such benefits may be realized without the provider having to serve the native application itself; rather, an application marketplace can be referred to and can handle such processing (including handling storage of the native application, interaction with application developers, bandwidth for the downloading of applications, and processing of financial transaction relating to the purchasing of applications).

Users may benefit from an improved experience by being made aware of native applications that they have interest in and otherwise would not know of. For instance, a user may use a web service on his/her desktop computer without knowing that a native application for the web service is available for the user's mobile computing device. By being made aware of such a native application, the user can install and run the native application on his/her mobile computing device, which may allow the user to access additional features (e.g., features based on motion and/or location based sensors) provided by the native application on the mobile computing device. Users can also save time by not having to search out native applications in which they may have a particular interest.

Advertisers may also benefit from providing users with native application suggestions. For example, by increasing the number of users who are using native applications, advertisers may be able to provide richer advertising experiences in native applications than advertisements provided through a web application. In another example, advertisers may be able to target users who are likely to be interested in particular native applications and to provide discounted pricing to such users, which can increase the effectiveness of ads provided by the advertisers.

The details of one or more implementations are set forth in the accompanying drawings and the description below. Other features and advantages will be apparent from the description and drawings, and from the claims.

DESCRIPTION OF DRAWINGS

In the drawings, like reference numbers refer to similar elements throughout.

DETAILED DESCRIPTION

The number of native mobile applications, which are also referred to as "apps," has increased in recent years. For many available web services, like banking services provided through a bank's website and email services provided through an email website, there are available native applications for multiple different mobile computing device platforms. However, many users are not aware that a native application is available for a web service that the users use. For instance, users of more complex web services may assume that the features of the web service are not available on a mobile computing device and, as a result, may not investigate whether a corresponding native application is available. In another example, it can be difficult for mobile computing device users to identify particular native applications from among all of the native applications that are available through application marketplaces. This document describes computer systems and techniques for identifying native applications that may be of interest to users and for notifying users of such native applications so as to improve native application discovery.

Figure 1A:
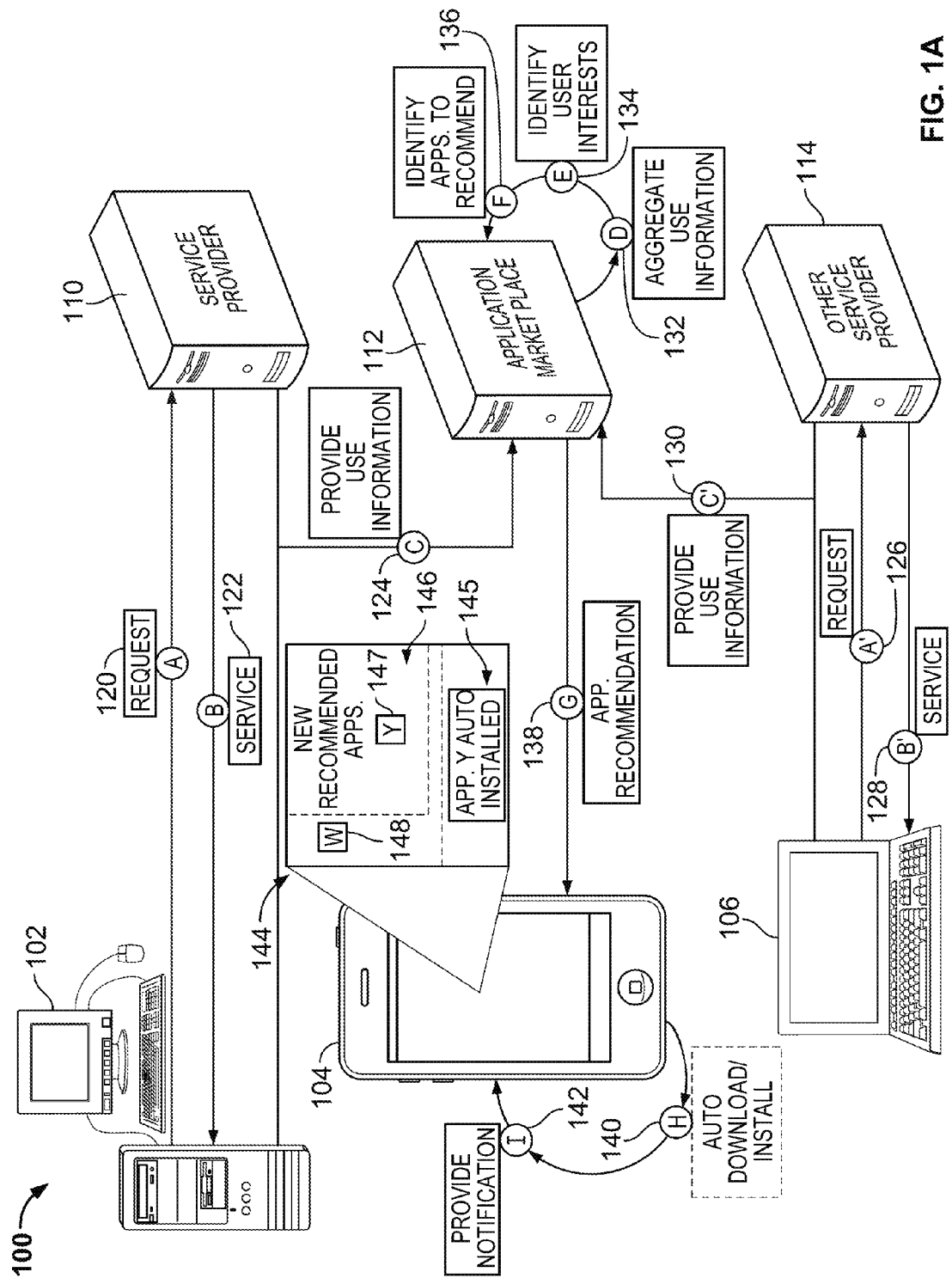
FIGS. 1A-B depict conceptual diagrams of example systems for determining and providing native mobile applications to a user of a mobile computing device.

FIG. 1A depicts a conceptual diagram of an example system 100 for determining and recommending relevant native mobile applications to a particular mobile device user. In general, the system 100 provides mechanisms by which a user may be notified of the existence of a native application based on web browsing activity and other information that indicates the user might be interested in obtaining a particular native application.

The example system 100 includes computing devices 102, 104, and 106 which are associated with a particular user. The computing devices 102, 104, and 106 can be any of a variety of appropriate computing devices, such as desktop computers (e.g., 102), laptop computers (e.g. 106), mobile computing devices (e.g. 104) (e.g., smartphones, cell phones, personal digital assistants (PDAs)), and/or tablet computing devices.

The example system 100 also includes service provider computer systems 110 and 114 that provide web-based services over one or more networks (e.g., the Internet, 3G/4G networks) to users in a client/server arrangement. The service provider computer systems 110 and 114 can be any of a variety of appropriate computer systems, such as a cloud-based distributed computing system. The service provider computer systems 110 and 114 can each provide any of a variety of computer services, such as financial management services, email services, news feed services, social networking services, on-line collaboration services, calendar management services, audio and video conferencing services, and shopping services.

The system 100 can also include an application marketplace computer system 112 that is a business system that implements an online software store that allows users to, among other things, browse and download mobile applications to compatible computing devices, such as the mobile device 104 depicted in FIG. 1A. The application marketplace computer system 112 can be any of a variety of appropriate computing systems, such as a cloud-based distributed computer system. The computing devices 102, 104, and 106 and computer systems 110, 112, and 114 can communicate with each other over one or more networks, such as the Internet, LAN, wide area network (WAN), virtual private network (VPN), wireless network, cellular network, 3G/4G network, fiber optic network, or any combination thereof.

In this example, the mobile device 104 is a hand-held computing device (e.g., a smartphone) that can include a number of applications installed thereon, such as a web browser application. Such a web browser is configured to enable a user to access resources associated with websites that are hosted by servers such as service providers 110 and 114, as well as the software provided by the application marketplace system 112. For example, and assuming throughout this example that the service provider 110 hosts an online newspaper website like the New York Times, a user may interact with the browser on mobile device 104 to request access to a web page "http://nytimes.com" managed by the service provider 110. In response, the service provider 110 may return content "HTML/JScript/etc." associated with the web page to the mobile device 104. The browser on mobile device 104, however, may not be the optimal software application for some tasks such as reading the New York Times. Rather, a native mobile application may be available that would provide the user an improved quality of experience as compared to the browser.

As discussed in greater detail below, user interest in a native application can be identified from user activity on computing devices other than a user's mobile computing device. For example, the use of web services provided by the service provider systems 110 and 114 on the desktop computing device 102 and the laptop computing device 106 can indicate that a user of the computing devices 102-106 is likely to be interested in installing a particular native application on the mobile computing device 104. Such activity on other computing devices is represented by example steps A and B. For instance, the desktop computing device 102 accesses a service provided by a web-based application service provider 110 by sending a request 120 (step A) over a computer network and the service provider 110 responds by providing the requested service 122 (step B) to desktop computing device 102.

The computing device 102 and/or the service provider 110 can be configured to provide use information 124 to the application marketplace system 112 (step C). The use information 124 may only be provided to the application marketplace 112 if the user has provided permission for the sharing of such information by the user's computing device 102 and/or by other computing devices, such as the service provider computer system 110. For example, providing use information 124 can be based on user permission through an opt-in feature. The use information 124 can be a variety of kinds of information. For example, by user permission, information pertaining to the user's web-browsing history can be provided. This can include the number of times that the user accessed particular websites over a period of time, and/or information identifying the duration of time the user spent interacting with a particular website. Another example of use information 124 that can be provided to the application marketplace system 112 in step C can be the user's bookmarked websites. Further, use information 124 can be based on the user's received email messages or email subscriptions.

The techniques described in this document may, in appropriate circumstances, permit a user to generalize or otherwise anonymize personal information that is provided to a central computer service, such as to the application marketplace system 112 and/or to the service provider systems 110 and 114. For example, where appropriate, a user may be provided with an option to opt in or opt out of personalization services that may need to obtain particular information in order to work properly. Also, a user's location or other information may be generalized, such as by reporting or saving the user's location according to a relatively large geographic metric, such as a zip code. Moreover, a service may limit the ways in which such information can be used or shared, and/or the length of time that the information can be stored. Such factors may be made known to a user who, in appropriate situations, may choose to provide more or less information, such as use information provided in step C and C' (124 and 130), while recognizing that the level of service they are provided may be reduced as the level of obtained information is decreased.

Use information may be aggregated for a particular user from more than one of the user's computing devices. For instance, use information can also be provided based on user activity on the laptop computing device 106. For example, the user may operate laptop computing device 106 to access via one or more networks the computer system of other service provider 114 as depicted in FIG. 1A. In similar fashion to the earlier description for computer 102, laptop 106 in step A' sends a request 126 to other service provider system 114. In response, other service provider system 114 in step B' provides service 128 to laptop 106. Similar to step C described above, use information 130 can be provided by the laptop computer 106 and/or the computer systems it has accessed (e.g. other service provider 114) to the application marketplace system 112 (step C'). Still further, mobile device 104 or the computer systems it has accessed can also provide similar use information to application marketplace system 122. This example illustrates that, for a single user, multiple sources and multiple types of use information can be provided to a computer system, such as application marketplace system 112, in order to build a complete profile of the user's computing interests.

The application marketplace system 112 is configured to receive, store, and process use information 124 and 130 provided by the computing devices 102 and 106, and/or the service provider computer systems 110 and 114. The use information for a particular user can come from multiple computing devices associated with the user, and can be a variety of types of information (e.g. bookmarks, browsing history, emails, email subscriptions, etc.) as described previously. The application marketplace system 112 can aggregate the entirety of use information associated with a particular user. In other words, the application marketplace system 112 can assemble the information that is received from a plurality of computing devices that are associated with a particular user (e.g. 102, 104, and 106 in example system 100). The application marketplace system 112 of example system 100 aggregates the use information 124 and 130 for the particular user, as depicted in step D (132).

In step E, the application marketplace system 112 can process and analyze the aggregated use information to identify user interests (134). A ranked and/or weighted collection of the user's interests can be provided. User interests can be indicated in a variety of ways, such as interest in particular subject matter, websites, particular web-based services, keywords, type of websites (e.g., news websites, social network websites). For example, if a user uses web-based services provided by the service providers 110 and 114 with at least a threshold frequency and/or for at least a threshold duration over a period of time, the user may be identified by the application marketplace 112 as being interested in these web-based services.

Using the interests identified in step E (134), the application marketplace system 112 can identify native applications that the user may be interested in installing on the mobile computing device 104, as indicated by step F (136). For example, user interests pertaining to a particular web-based service can be used to identify a native application that corresponds to the web-based service. Such a correlation between a web-based service and a native application can be identified in any of a variety of appropriate ways, such as by accessing information stored by various mobile application stores that identifies web-based services that correspond to particular native applications offered for sale and/or download by the mobile application stores, parsing information (e.g., meta-tag data) provided with web-based services that identifies corresponding native applications (e.g., information that uniquely identifies a corresponding native application provided by one or more application stores), and/or performing an automated web crawl to discover native applications that are offered on websites. The application marketplace system 112 can use, at least, the user interest information identified in step E (134) and the information correlating native applications with web-based services to identify one or more native applications in which the user is likely to be interested. For example, if the user uses web-based services provided by the service providers 110 and 114, and there is a native application associated with the web-based service provided by service provider 110 but not for the web-based service provided by the service provider 114, the application marketplace 112 can recommend the native application associated with the service provided by the service provider 110.

Other information may also be used to identify native applications to recommend to the mobile computing device 104. For example, information indicating which native applications have previously been installed on the mobile computing device 104 can be used to provide native application recommendations. For instance, if a user has installed native applications of a particular type, such as games and productivity applications (e.g., word processing applications, spreadsheet applications), such installations can indicate that the user is interested in running and installing the particular type of applications on the mobile computing device 104. The application marketplace 112 may use the user's interest in applications of particular types to identify native applications to recommend for installation on the mobile computing device 104. In another example, if a particular application was previously installed on the mobile computing device 104 and then uninstalled, the application marketplace 112 may eliminate that particular application from consideration when providing native application recommendations.

In step G (138), the application marketplace system 112 can send to the user's mobile computing device 104 a recommendation concerning the native applications that were identified to be recommended in step F (136). The recommendation can be provided to the mobile computing device 104 in any of a variety of appropriate ways, such as providing information regarding the identified native applications for presentation to the user on the mobile computing device 104 (e.g., providing textual and/or graphical recommendation to be displayed by the mobile computing device 104) and/or providing the identified native applications to the mobile computing device 104 for installation/use. The native application recommendation can be provided by the application marketplace system 112 to the mobile computing device 104 in response to a request (not depicted) from the mobile computing device 104. For example, the mobile computing device 104 can be configured to periodically request recommendations for native applications from the application marketplace system 112. In another example, such a request from the mobile computing device 104 can include a request for other content from the application marketplace system 112, such as a request from an native application for the application marketplace on the mobile computing device 104 and/or a request from a web browser running on the mobile computing device 104 for a webpage for the application marketplace. The application recommendation can be provided in with responses to these other requests from the mobile computing device 104 and can be presented to the user with the other content requested by the mobile computing device 104 from the application marketplace system 112.

In another example, the application marketplace system 112 can be configured to push recommendations out to the mobile computing device 104 without receiving an explicit (e.g., request for native application recommendation) or implicit request (e.g., request for other content from the application marketplace system 112) for such a recommendation. Such a mechanism to push recommendations to the mobile computing device 104 may be provided by the application marketplace system 112 based on a user of the mobile computing device 104 opting-in for such a feature. Native application recommendations can be provided to the mobile computing device 104 by the application marketplace system 112 at any of a variety of appropriate times, such as periodically (e.g., once a week, once a month, once a quarter), when new native applications and/or new versions of native applications that have been identified for recommendation to the user become available, and/or when the user of the mobile computing device 104 is identified as having at least a threshold likelihood of being interested in and/or purchasing a particular native application to be recommended to the user.

In some implementations, the recommended native application(s) can be automatically downloaded and, in some cases, installed on the mobile computing device 104, as indicated by step H (140). For example, the mobile computing device 104 can be configured to, in response to receiving a native application recommendation from the application marketplace system 112, automatically download and, in some cases, install the recommended native application from the application marketplace system 112 and/or from another computer system providing the native application. Such automatic downloading may be delayed until appropriate times, such as when the mobile computing device 104 is inactive (e.g., overnight), when particular network connections are available (e.g., available wifi connection, at least a minimum data transmission rate, at least a minimum remaining capacity on a revolving data plan for the mobile computing device 104), and/or when particular device conditions are met (e.g., connected to external power source, at least a minimum battery charge). In another example, recommended native applications can be pushed out to the mobile computing device 104 by the application marketplace system 112 in association with the application recommendation A user may opt-in for the mobile computing device 104 to automatically download and/or install recommended native applications.

A notification regarding the recommended native application(s) can be provided on the mobile computing device 104, as indicated by step I (142). Such a notification can be provided in any of a variety of appropriate ways, such as by providing notifications to be output on the mobile computing device 104 (e.g., providing push notifications on the mobile computing device 104) and/or by placing an entry for the recommended native application(s) at one or more particular locations on the mobile computing device 104 (e.g., placing automatically downloaded/installed native applications in a particular folder on the mobile computing device 104, placing icons for automatically downloaded/installed native applications in a designated area on a desktop of the mobile computing device 104, adding information that identifies the recommended native application(s) to a list of recommendations for the user). In some implementations, a user of the mobile computing device 104 can alternatively and/or additionally opt to receive mobile native application recommendations through one or more communication accounts associated with the user (e.g., email, text message, voicemail, notification on a social networking site). In such implementations, the notification provided to the mobile computing device 104 can be provided to the mobile computing device 104 through one or more designated communication accounts (e.g., email, text message) and can be presented on the mobile computing device 104 using one or more applications associated with the communication channels, such as an email application and/or a text messaging application.

An example user interface 144 depicts example notifications that can be provided on the mobile computing device 104 for a recommended native application that was automatically installed on the mobile computing device 104. In the depicted example, the native application Y is automatically installed on the mobile computing device 104. A visual notification 145 (e.g., a push notification) is presented in the user interface 144 indicating that the application Y has been installed on the mobile computing device 104. Other types of notifications, such as audio notifications, are also possible.

Another notification regarding application Y is provided by the placement of an icon 147 for application Y in a particular area 146 of the user interface 144 that is designated for newly recommended, downloaded, and/or installed native applications. The location of the icon 147 for application Y is in contrast to the location of another icon 148 for application W, which is an application previously installed on the mobile computing device 104 (that not a newly recommended native application). The area 146 can allow users to readily identify newly recommended and/or installed native applications on the mobile computing device 104, so that they are not lost among a larger pool of icons in the user interface 144. Users can transition recommended native applications out of the designated area 146 and into the general pool of native applications on the mobile computing device 104 (e.g., such as native application "W" that is associated with icon 148) by provide input that indicates user intent to keep the recommended native application, such as by selecting the icon 147, by dragging the icon 147 out of the area 146, by installing the native application Y (if the native application Y was not also automatically installed), and/or by launching and running the native application Y associated with the icon 147. If a user has not transitioned the application Y out of the area 146 within a threshold period of time (e.g., one day, one week, one month), the mobile computing device 104 can uninstall and/or delete the native application Y from the mobile computing device 104.

Following the installation of a native application on the mobile computing device 104, the native application may provide enhanced features or improved capabilities as compared to the features offered by a web browser interface. For example, a native application can include features that are specific to additional types of input that are available on the mobile computing device 104, such as motion based controls (e.g., tilting the mobile computing device 104, shaking the mobile computing device 104), touchscreen-based controls (e.g., tapping and/or swiping across a touchscreen), and/or location associated features (e.g., providing particular content that based on the current location of the mobile computing device 104).

As an illustrative example of the system 100, the service provider system 110 can provide a web-based service for managing finances (e.g., bank accounts, retirement accounts, stock accounts) that a user of the computing device 102 can access. Use of the service provided by the service provider 110 from the computing device 102, as indicated by steps A (120) and B (122), as opposed to access from the mobile computing device 104, can indicate that the user is unaware of the native application for the service and/or the additional features that may be available on the native application (e.g., features beyond browser-based features that may be provided through accessing the service provided by the service provider 110 from a web browser application on the mobile computing device 104). Based on use information indicating that the user has accessed the financial service provided by the service provider 110, the application marketplace system 112 can provide a recommendation to install the native application for the financial service to mobile computing device 104, as described with regard to steps D-I (132-142) above.

Figure 1B:
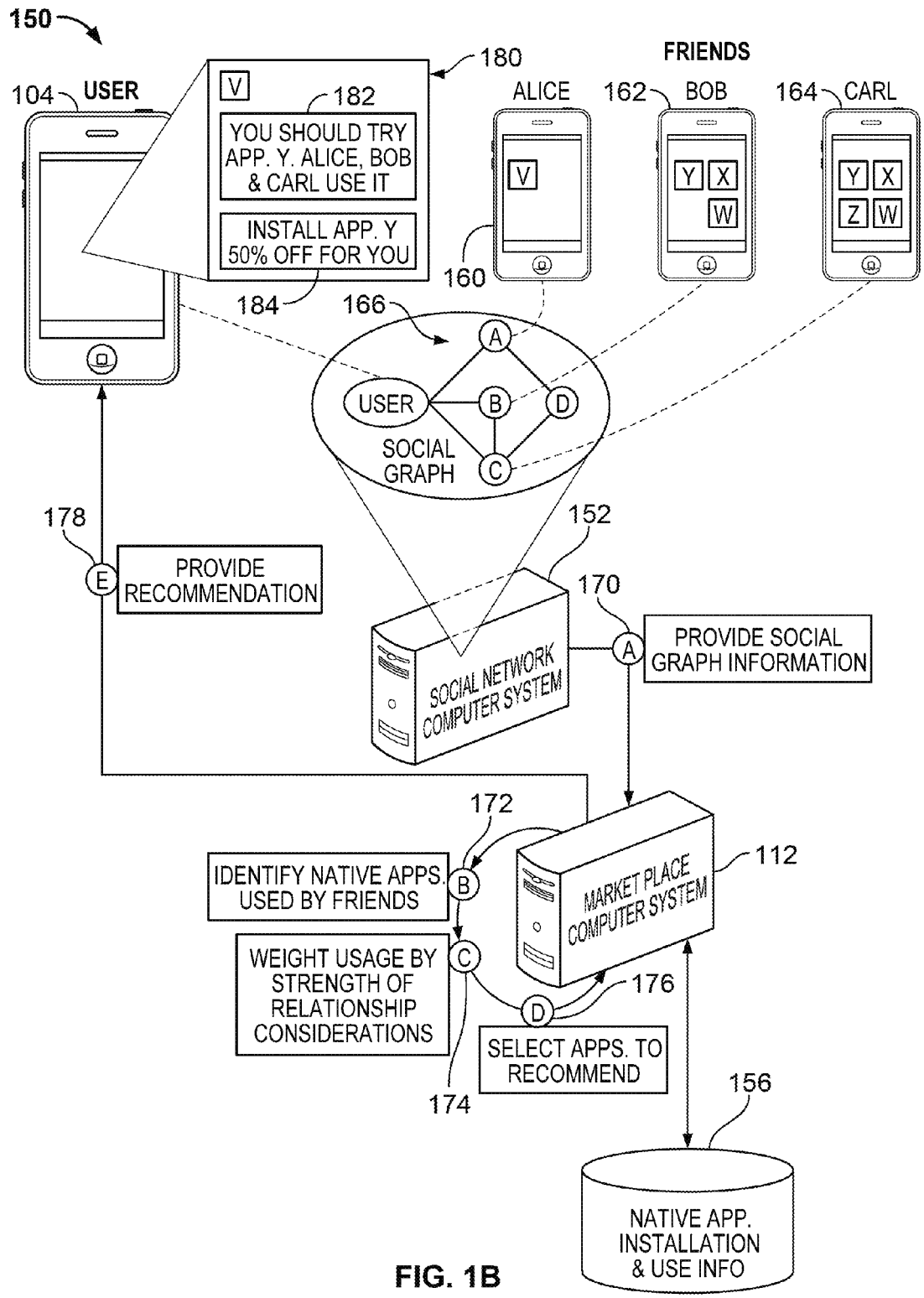

FIG. 1B is a conceptual diagram of an example system 150 for determining and recommending native mobile applications to a user of a mobile computing device 104. In general, the system 150 identifies and recommends native applications to a user of the example mobile computing device 104 based, at least in part, on the use of native applications among the user's acquaintances on one or more social networks. Such native application recommendations can additionally be provided by the system 150 based on the factors discussed above with regard to the application marketplace system 112.

The example system 150 includes an application marketplace computer system 112 and a social network computer system 152. The social networking computer system 152 can include one or more computing devices (e.g., network of computer servers, cloud computing system, desktop computer) provide a social networking service, such as GOOGLE+. For example, the social networking computer system 152 can provide social network content (e.g., posts, comments, pictures, links, profile pages) to computing devices for presentation to users of the social network. The social network computer system 152 can maintain a social graph 166 that includes nodes representing users of the social network and links that represent connections between the users, such as acquaintance relationships (e.g., friends, friends of friends, colleagues), interaction between users of the social network (e.g., profile page views, messaging between users), and/or designation to follow other users (e.g., follower designation, fan designation). Information from the social graph 166 can be provided by the social network computer system 152 to the application marketplace computer system 112 to identify, for a particular user, application usage by other users to whom the particular user is connected so as to identify new native applications that the particular user may be interested in but not yet know about.

The example social graph 166 is a simplified social graph that depicts a user of the mobile computing device 104 being directly connected to users Alice ("A"), Bob ("B"), and Carl ("C"). Further, social graph 166 depicts these additional connections that link B with C, and both A and C with another subscriber D, who does not have a direct relationship with the user of mobile computing device 104 or B. Such relationships, defined by a social network system for a subscriber who is also a mobile device user, can be used to identify potentially relevant native mobile applications for the mobile device user as described below.

Like the user being associated with the mobile computing device 104, each of these other users is indicated as being associated with mobile computing device 160-164. Although a one-to-one relationship between users and mobile computing devices is depicted, a user can be associated with more than one mobile computing device (e.g., a user can have a smartphone and a tablet computing device). Additionally, multiple users can be associated with the same mobile computing device (e.g., multiple users use the same tablet computing device). The mobile computing devices 160-164 can be any of a variety of appropriate computing devices, such as smartphones, cell phones, PDAs, and/or tablet computing devices. The mobile computing devices 160-164 are shown as having one or more native applications installed on them, as indicated by the applications icons W, X, Y, and Z that displayed on the devices 160-164.

In step A (170), social graph information is communicated by social network computer system 152 to marketplace computer system 112 over one or more networks (the Internet, LANs, WANs, VPNs, wireless network, cellular network, 3G/4G network, fiber optic network, or any combination thereof). The information that is provided to the application marketplace computer system 112 can include a variety of details regarding users and connections between users on the social network, such as information identifying types of relationships between users (e.g., friends, family, co-workers, classmates, friends of friends, recent friends, longtime friends), group affiliations (e.g., member of group, supporter of group), and/or information indicating the strength of relationships between users (e.g., time users spent viewing each other's user profiles, number of messages sent between users, type of relationship between users).

The marketplace computer system 112 can receive the social graph information and can use the social graph information to identify, for the user of the mobile computing device 104, native applications that are used the other users of the social network to whom the user of the mobile computing device 104 is connected (Alice, Bob, and Carl), as indicated by step B (172). The information identifying the native applications used by individuals can reside, for example, in a data repository such as the native application installation and use information repository 156 that can be maintained and accessed by marketplace computer system 112. The social network information can be correlated with the native application installation and usage information stored in the repository 156 to identify the native applications that are installed on the mobile computing devices 160-164 that are associated with Alice, Bob, and Carl. Users may opt-in to allow the social network computer system 152 and the application marketplace computer system 112 to use information regarding their social network connections and native application installation/usage to provide native application recommendations to other users.

Using the example social graph 166 to illustrate step B (172) with regard to the user of the mobile computing device 104, the marketplace computer system 112 can first identify other users who have at least a threshold connection (e.g., direct connection, minimum strength of relationship, type of connection) to the user of the mobile computing device 104 and, using those identified users (in this example, Alice, Bob, and Carl), can query the native application installation and use information repository 156 to get information regarding the native applications used by Alice, Bob, and Carl. In response, the marketplace computer system 112 can receive information indicating that Alice has installed native application Y on her associated mobile computing device 160; that Bob has installed native applications W, X, and Y on his associated mobile computing device 162; and that Carl has installed native applications W, X, Y, and Z on his associated mobile computing device 164. The marketplace computer system 112 can determine aggregate installation information, for example, that application Y has been installed by three individuals that have direct relationship linkages with the user of mobile computing device 104, and application Z has only been installed by one such individual.

Step B (172) can also include processing data further defining use information regarding the installed native applications. For example, use information such as the amount of time over a period of time that a particular user spends interacting with a native application (e.g., number of minutes per day), and/or the number of times over a period of time that a particular user accesses a native application (e.g., number of accesses per week) can be identified by the marketplace computer system 112 in step B (172). With such information, marketplace computer system 112 can identify the native applications most used by those who are connected to the user of the mobile computing device 104 on the social network. The use and installation information can be combined (e.g., installation instances can be weighted by use) and the application marketplace computer system 112 can infer that the more frequently a particular native application is installed and used across mobile computing devices associated with a user's acquaintances on a social network, the more likely the user is to be interested in the particular native application.

In step C (174), marketplace computer system 112 can combine (weight) the installation and usage information for native applications on the mobile computing devices 160-164 with the previously described indicators of the strength of the social network relationships (e.g., type of connection, frequency of interaction) from the social graph information. For example, assume that the user of the mobile computing device 104 has the strongest relationship with Carl (e.g., they are designated as friends on the social network and the frequently interact with each other on the social network) and a weakest relationship with Bob (e.g., they are friends of friends and infrequently interact). Accordingly, Carl's installation and use of native applications W-Z on the mobile computing device 164 can be weighted more heavily than Bob's installation and use of applications W-Y on the mobile computing device 162 by the application marketplace computer system 112—meaning a user is more likely to share common interests with his/her close friends, such as Carl, than with other users to whom he/she is not as closely connected, such as Bob. This weighted installation and use information for other users (e.g., Alice, Bob, and Carl) of the social network can be used by the application marketplace computer system 112 to select native applications to recommend for installation on the mobile computing device 104.

In step D (176), marketplace computer system 112 can select one or more native applications to recommend for installation on the mobile computing device 104. The selection can be based on the weighted installation and use information for the other users (Alice, Bob, and Carl), as determined in at step C (174). As an illustrative example, the application marketplace computer system 112 can select the application Y based, at least in part, on the native application Y having been commonly installed across each of the mobile computing devices 160-162. Other outcomes are also possible based on the strength of relationships among the user of the mobile computing device and the users Alice, Bob, and Carl; and/or based on the frequency of use of the native applications by those users on the mobile computing devices 160-162. For instance, if Carl has the strongest relationship with the user of the mobile computing device 104 and frequently uses the application Z, the application marketplace computer system 112 could recommend the application Z even though it is only installed on Carl's mobile computing device 164, depending on the relative strength of relationships with users Alice and Bob, as well as their use of the applications that are installed on their mobile computing devices 160 and 162, respectively.

In step E (178), marketplace computer system 112 can provide a recommendation of one or more native applications to the mobile computing device 104. Native application recommendations in step E (178) can be presented to a user of a mobile computing device in any of a variety of ways, similar to the discussion above with regard to step I (142) (e.g., by push notifications, automatic download and install, automatic download with installation by user command, and/or by a digest-style email notification). The user may be able to select the type of recommendation they want their mobile computing device 104 to receive. An example user interface 180 for the mobile computing device 104 provides an example of a recommendation being presented to the user with a push notification 182 and associated promotional information 184. For instance, publishers of native applications and/or the application marketplace computer system 112 may provide promotional rates to users for purchase and installation of recommended native applications. The notification 182 and/or the promotional information 184 can be provided such that a user can readily select the notification 182 and/or promotional information 184 to learn more about the associated native application (e.g., link to a product page for the native application), preview, and/or purchase the associated native application.

Various types of additional information can also be presented to the user along with the recommendation. For example, as shown, the push notification 182 can include information regarding the basis on which the particular native application is being recommended (e.g., information identifying use of the recommended native application by Alice, Bob, and Carl).

Figure 2:
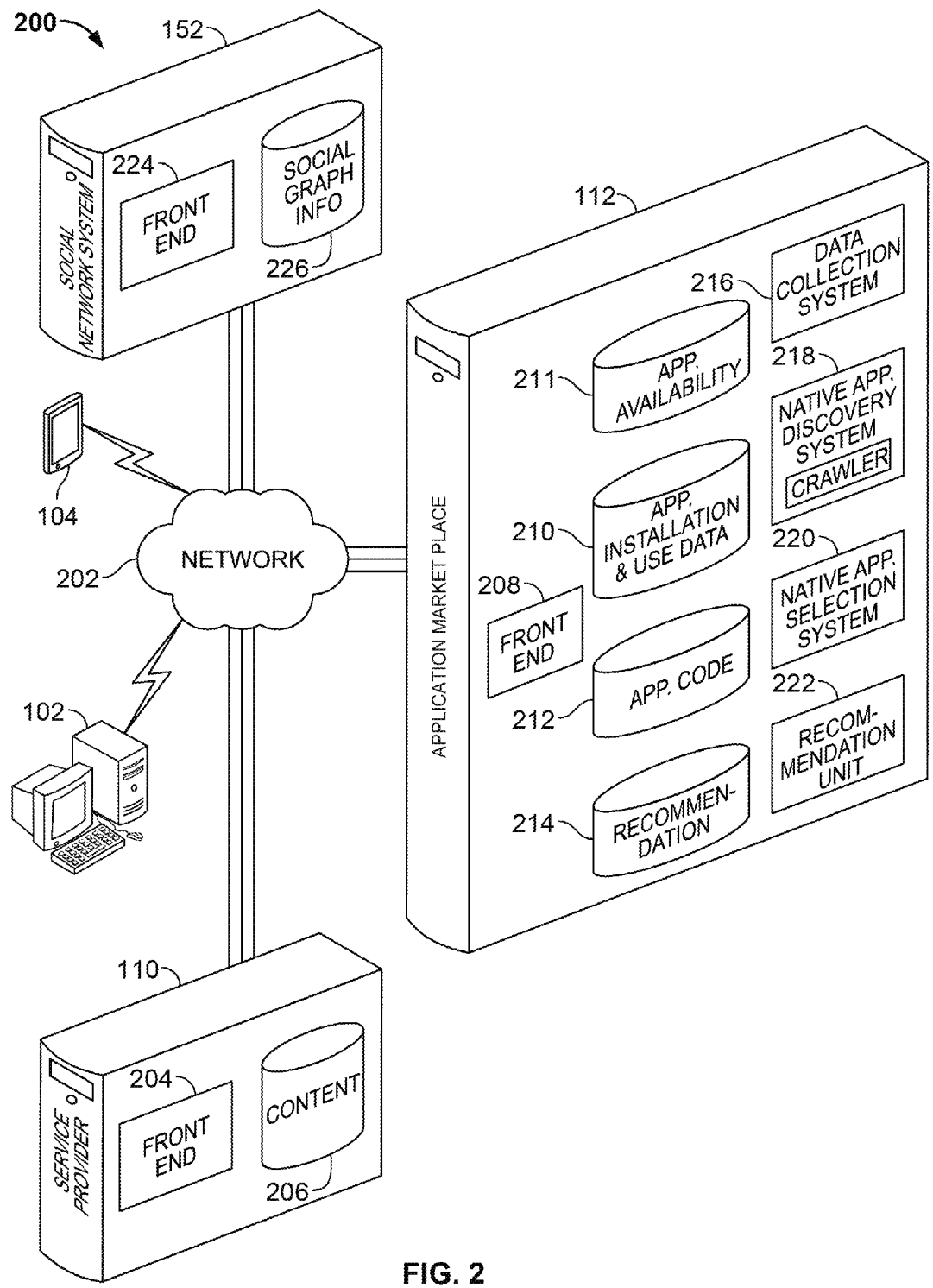
FIG. 2 depicts an example system for determining and providing recommendations for native mobile applications to a mobile computing device.

FIG. 2 depicts an example system 200 for determining and providing recommendations for native mobile applications to a mobile computing device 104. The system 200 can be similar to and provide the features described with regard to the systems 100 and 150 described above and depicted in FIGS. 1A-B.

The example system 200 includes the computing device 102 (e.g., a desktop computing device), the mobile computing device 104 (e.g., smartphone, tablet computing device, PDA, cell phone), the service provider computer system 110 (an example system providing web-based services and/or content to client computing devices), the application marketplace computer system 112 (e.g., GOOGLE PLAY), and a social network computer system 152 (e.g., GOOGLE+). The example system 200 also includes one or more networks 202 over which the computing device 102, the mobile computing device 104, the service provider computer system 110, the application marketplace computer system 112, and/or the social network computer system 152 can communicate. The network 202 can be any of a variety of appropriate networks over which data can be transmitted between devices/systems, such as the Internet, a LAN, a WAN, a VPN, a wireless network, a cellular network, a 3G/4G network, a fiber optic network, or any combination thereof.

In one example scenario, a user of computing device 102 or mobile computing device 104 may interact with service provider computer system 110 to request web-based services, such as financial management services, over network 202 in a client/server arrangement. The service provider computer system 110 can include a front end 204 that manages interactions with clients over the network 202 and that delivers requested content to the clients. The service provider computer system 110 can also include a content repository 206 that stores content (e.g., web pages, templates, images, videos, data, code for dynamically generating content) that is accessible as part of the service provided by the service provider computer system 110. The front end 204 of service provider computer system 110 can receive the request for access from the computing device 102, can query the content repository 206, and can transmit the requested content (e.g. HTML/Jscript/etc.) over the network 202 to the computing device.

The service provider computer system 110 and/or the computing devices 102/104 can send use information, for example pertaining to the user's interactions with the service provider 110, to the application marketplace computer system 112 over network 202. A data collection system 216 of the application marketplace computer system 112 can receive the use information and store it in a database, such as an application installation and use data repository 210 that is maintained as part of the application marketplace computer system 112. The application installation and use data repository 210 can store a variety of information that identifies use and installation of web-based services and/or native applications. The application installation and use data repository 210 can also store statistics regarding application use, such as amounts of time that applications are used and/or frequency of use.

In another example scenario, the computing device 102 and/or the mobile computing device 104 can be associated with a user of a social network service provided by the social network system 152. A front end 224 of social network system 152 can receive the user's requests for social network content (e.g., profile pages, new content for a news feed), can query a social graph information repository 226 that stores information regarding users and connections between users on the social network and/or a social network content repository (not depicted) that stores content (e.g., comments, links, images, videos) provided as part of the social network, and can return the requested content to the user's computing device 102/104. In addition, social network system 152 can send social graph information to the application marketplace server 112 over network 202. The data collection system 216 of the application marketplace server 112 can collect the social graph information and can correlate the social graph information with users identified in the application installation and use data repository 210 (e.g., match-up a user's application installation and use with the user's connections to other users on the social network). Such correlation information can be stored in the application installation and use data repository 210.

The application marketplace computer system 112 can be configured to recommend native mobile applications to the user of mobile device 104 in any of a variety of appropriate ways, such as those describe above with regard to systems 100 and 150. The data collection system 216 can obtain, process, and store information regarding the use of web-based applications/services, the installation and use of native applications on mobile computing devices, and/or social graph information. The data collection system 216 can receive transmissions from the computing devices 102/104 and/or from systems such as the service provider system 110 and the social network system 152, and/or the data collection system 216 can periodically poll such devices and systems for pertinent information. The application installation and use data repository 210 can additionally contain information regarding native mobile applications that were purchased, downloaded, and/or installed using the application marketplace computer system 112.

The native application discovery system 218 is configured to identify native applications that exist and that are available to recommend to users. The information obtained by the native application discovery system 218 can be used to identify native applications that are associated with web-based services that are provided by service providers, such as the service provider 110. The native application discovery system 218 can identify native applications using any of a variety of appropriate techniques, such as by accessing information that identifies native applications that are available at various mobile application stores, by parsing information (e.g., meta-tag data) provided with web-based services that identify native applications corresponding to the web-based services (e.g., information that uniquely identifies a corresponding native application provided by one or more application stores), and/or by performing an automated crawl of available web-based content to discover native applications that are offered on various websites. The native application discovery system 218 can store information that identifies available native applications in the application availability repository 211.

The application marketplace computer system 112 can store native mobile applications that are made available on an application marketplace service provided by a front end 208 of the marketplace computer system 112 in an application code repository 212. A native application selection system 220 can process the information contained in the repositories (e.g., use information, social graph information, native application availability, previously recommended native applications) to make a determination of the one or more native applications to recommend. The native application selection system 220 can select applications to recommend to users using one or more of the techniques described above with regard to systems 100 and 150. The native application selection system 220 can identify applications to recommend prospectively (e.g., during times of low activity on the application marketplace computer system 112) and can store recommendations in a recommendation repository 214. The next time an opportunity arises to provide a recommendation for a native application to a particular user (e.g., the mobile computing device 104 requests a recommendation, the mobile computing device 104 accesses the application marketplace 112, a time interval for periodically providing recommendations to the particular user expires), the stored recommendations can be retrieved from the recommendation repository 214 for the particular user and provided to the mobile computing device associated with the particular user (e.g., the mobile computing device 104). Alternatively and/or additionally, the native application selection system 220 can identify native applications to recommend on demand (e.g., in response to a request for a native application recommendation).

The recommendation unit 222 can manage delivery of native application recommendations that have been determined by the native application selection system 220. The recommendation unit 222 can store the recommendation in the recommendation repository 214 and provide the recommendation in any of a variety of appropriate ways (e.g., push notification, provide native application) to the mobile computing device 104, as described above with regard to systems 100 and 150. The recommendation repository 214 can also store information that identifies previous recommendations that were provided to users and information that indicates whether users acted on the recommendations (e.g., downloaded, installed, and/or purchased the recommended application). Such information identifying previous recommendations and recommendation conversions (users acting the recommendations) in the recommendation repository 214 can additionally be used by the native application selection system 220 to identify native application to recommend to users. For example, using a history of the types of recommended native applications that the user previously installed, and those that were not installed, the native application selection system 220 can get an indication of the types of native applications that are typically the most relevant to the user.

Figure 3A:
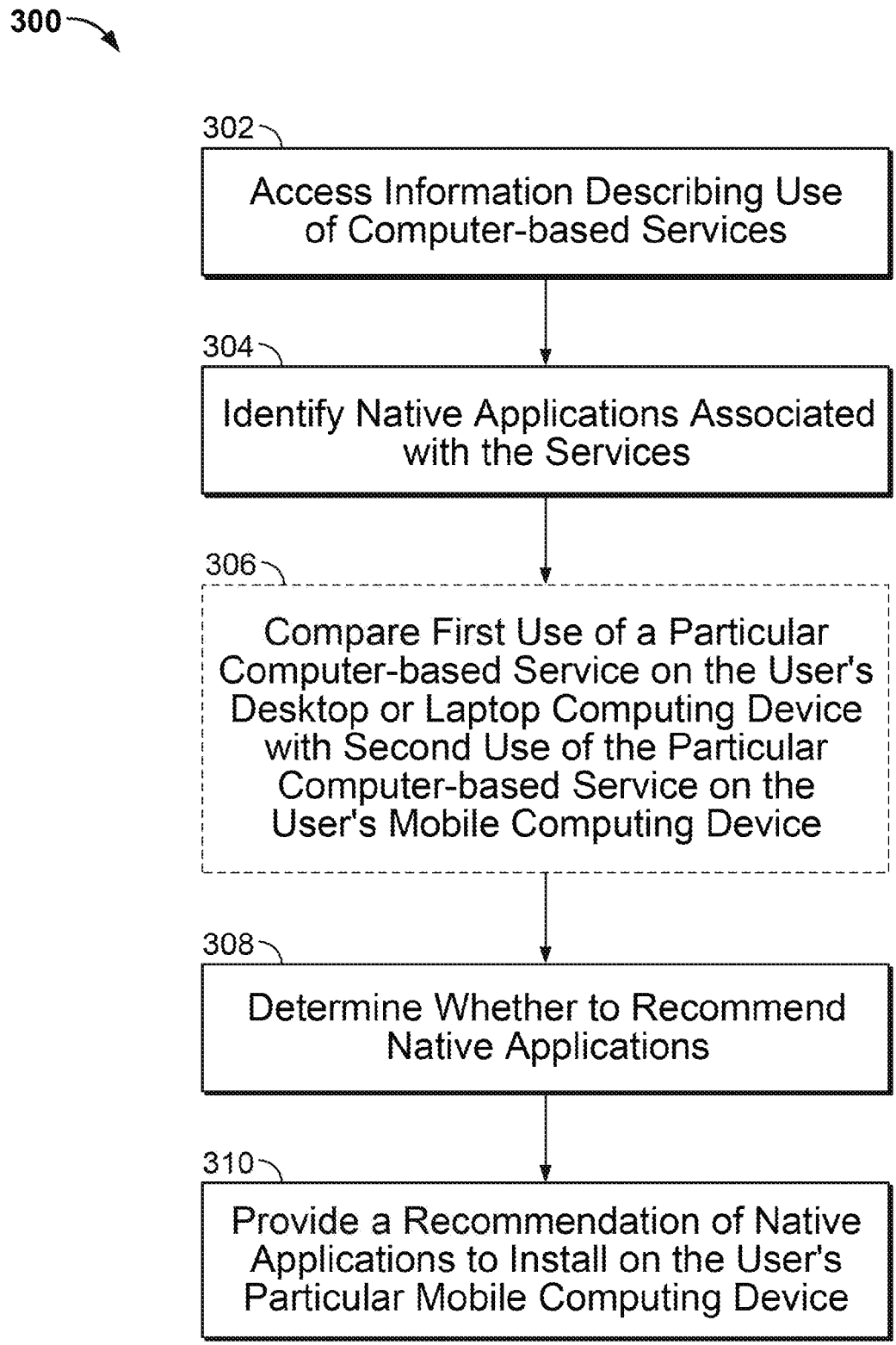
FIGS. 3A-B depicts flowchart for example techniques for providing native application recommendations.
Figure 3B:
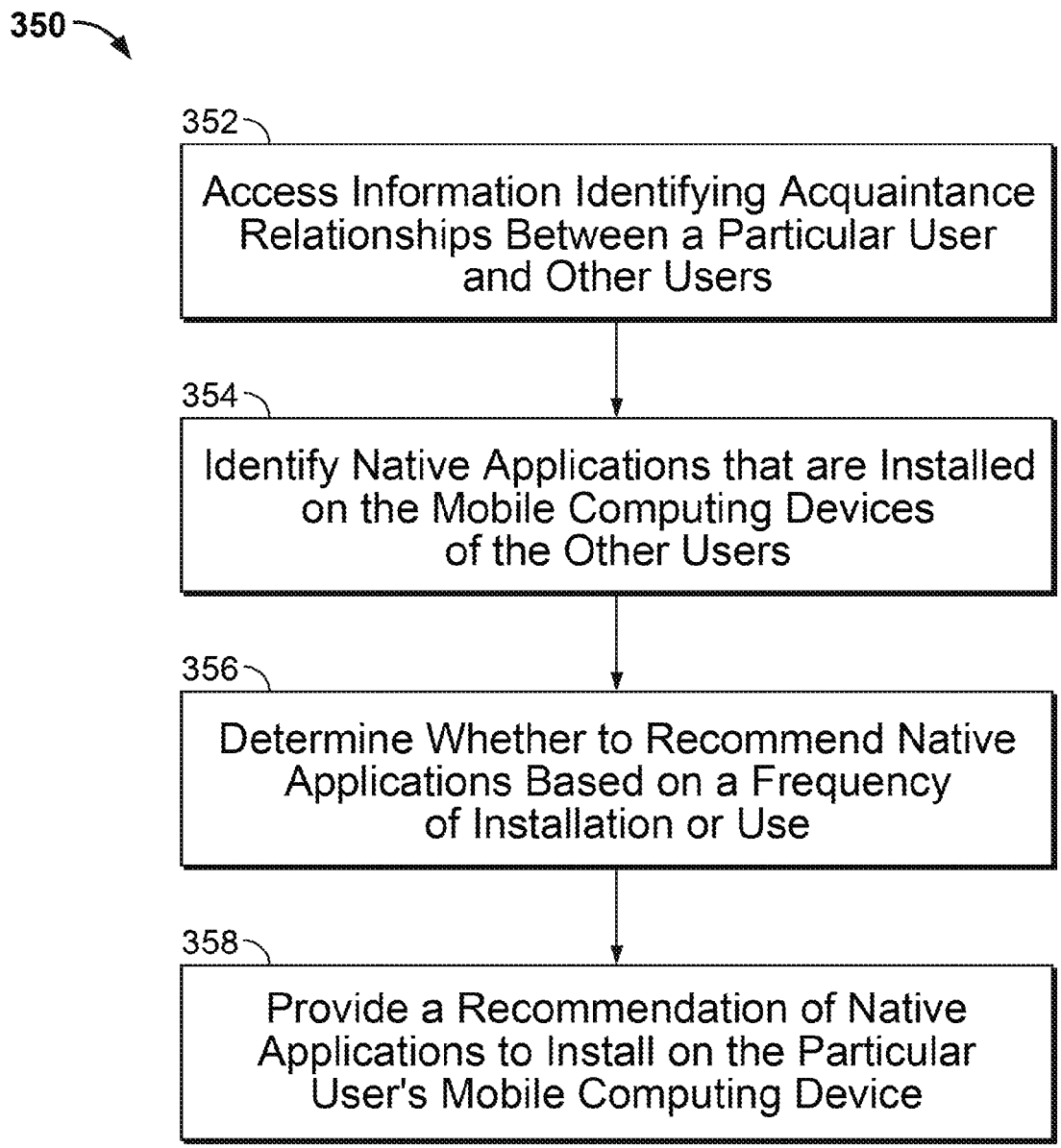

FIGS. 3A-B depicts flowchart for example techniques 300 and 350 for providing native application recommendations. The techniques 300 and 350 can be performed by any of a variety of appropriate computing devices and/or systems, such as the application marketplace computer system 112.

Referring to FIG. 3A, information describing a particular user's utilization of computer-based services can be accessed (302). Such information can be accessed in a variety of ways, such as by receiving information from client devices (e.g., the computing devices 102 and 106) that identify web-based services accessed on these devices, receiving information from service providers regarding service use, and/or by periodically querying such client devices and/or other systems for information regarding the use of web-based services. The information being accessed can include a variety of types of information, such as a particular user's usage of particular web-based services, other web-browsing information, information identifying websites that a user has bookmarked, and/or email subscriptions. The information can be aggregated for a particular user so as to create a profile of the user's computer use and interests.

At 304, native applications can be identified are associated with web-based services that a particular user has accessed. For example, the application marketplace computer system 112 can identify a native application offered by a web-based application service provider that is used by the particular user as a candidate to be recommended to that particular user. The application marketplace computer system 112 can also identify native applications that are associated with other types of computer use by a particular user. For example, if a user has bookmarked a website and the website offers a mobile application, then the application marketplace computer system 112 can identify the website's mobile application as being a candidate to recommend to the user.

In some implementations, a comparison can be made between use of a particular computer-based service on a desktop or laptop computer by a particular user and access of the same service on a mobile computing device associated with the user (306). For example, the application marketplace computer system 112 can compare use information (e.g., time of use, frequency of use) for a particular user's access of a web-based application on desktop/laptop computing devices and mobile computing devices to determine whether to recommend a native application associated with the web-based application. For instance, the application marketplace computer system 112 may recommend particular native applications where a user has accessed a corresponding web-based service more frequently from a desktop computer than from a mobile computing device over other native applications where the inverse is true (user accessed a corresponding web-based service more frequently from a mobile computing device than from a desktop computer). Greater access on a desktop/laptop computer may indicate that the user views a web-based service is insufficient and/or hard to use on a mobile computing device, which is a problem that a native mobile application can solve through mobile device specific features (e.g., different user interface controls for a mobile computing device).

At 308, a determination can be made as to whether to recommend the native applications that have been identified for computer-based services that a user has been identified as using. For example, the application marketplace computer system 112 can determine whether to recommend a particular native application to a user of the mobile computing device 104 based on a variety of factors, such as use of web-based services on the computing devices 102 and 106, web browser bookmarks, subscriptions to various content feeds (e.g., news feeds, email subscriptions, social network feeds), installation and use of native applications by friends of the user on one or more social networks, and/or actions taken by the user in response to previous native application recommendations.

At 310, a recommendation for one or more native mobile applications can be provided to a user's mobile computing device based on the determination as to whether to recommend particular native mobile applications. This recommendation can be provided to and presented on a mobile computing device in a variety ways, and the user may select their manner of delivery and presentation. For example, as portrayed in example system 100, the recommended native applications can be automatically downloaded and installed onto the user's mobile computing device 104, and a message that the native application was installed can be provided to the user on the mobile computing device 104. The user could alternatively choose to receive a variety of other types of recommendation presentations, such as a push notification, an email, a notification on an application marketplace website, and/or an SMS message.

Referring to FIG. 3B, information describing a particular user's acquaintance relationships can be accessed (352). For example, the application marketplace computer system 112 can access social network information in various ways, such as by receiving transmissions from one or more social network systems.

One or more native mobile applications that are installed and/or used by a particular user's acquaintances on one or more social networks can be identified (354). For example, the application marketplace computer system 112 can correlate the accessed social network information with information identifying installation and use of native mobile applications by users to identify native mobile applications that have been installed and/or used by acquaintances of a particular user on one or more social networks.

A determination can be made as to whether to recommend one or more native applications based, at least in part, on the frequency of use and/or installation of native applications by acquaintances of a particular user on one or more social networks (356). For example, as described above with regard to FIGS. 1A-B and 2, the application marketplace computer system 112 can make such a determination based on any of a variety of appropriate factors, such as the number of a user's acquaintances who have installed native mobile applications, the frequency with which such acquaintances have used the native mobile applications, the time duration that such acquaintances have used the native mobile applications over a period of time, and/or information identifying uninstallations of the native mobile applications by the acquaintances. Such factors can additionally be weighted by the strength of relationship between a particular user and each of the particular user's acquaintances on one or more social networks, as indicated by the accessed social network information. Native mobile application installations, use, and uninstallations by acquaintances with a stronger relationship with the particular user can be weighted greater than such activity by acquaintances with a weaker relationship with the particular user in identifying one or more native applications to recommend to the particular user.

A recommendation for one or more native mobile applications can be provided to a mobile computing device associated with the particular user (358). For example, the application marketplace computer system 112 can present to the mobile computing device 104 a recommendation of native applications to be installed on the user's mobile computing device. Such a recommendation can be presented in in any of a variety of ways, as described above with regard to FIGS. 1A-B, 2, and 3A.

Figure 4:
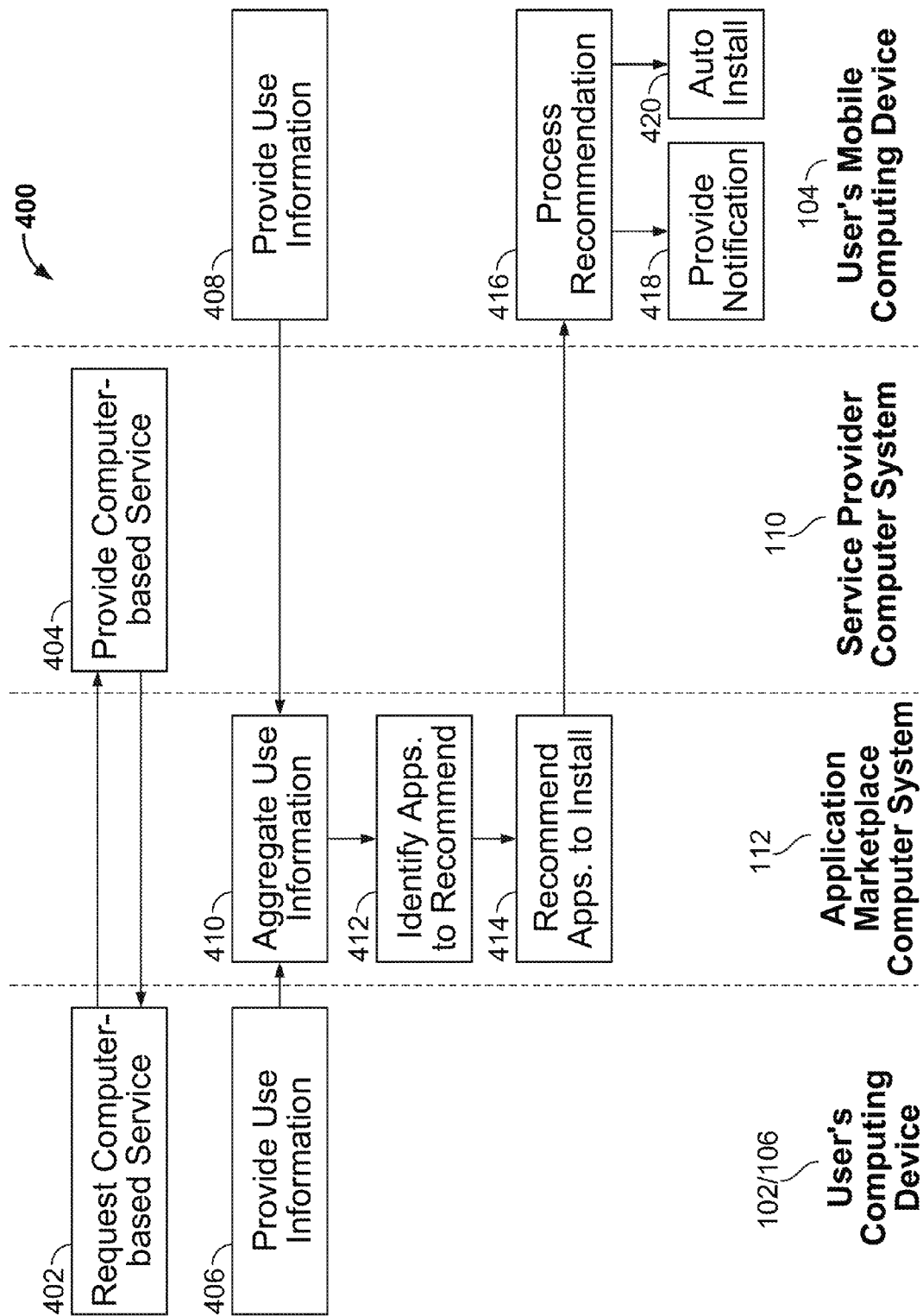
FIG. 4 is a flowchart of an example technique for providing recommendations for native mobile applications to a mobile computing device.

FIG. 4 is a flowchart of an example technique 400 for providing recommendations for native mobile applications to a mobile computing device 104. As indicated in FIG. 4, portions of the example technique 400 are performed by user the computing devices 102 and/or 106, the application marketplace computer system 112, the service provider computer system 110, and/or the mobile computing device 104. However, the steps shown here may be supplemented, rearranged, and performed on different types of systems as appropriate.

The technique 400 is depicted as including the computing devices 102 and/or 106 requesting access to a computer-based service provided by the service provider computer system 110 (402). As described above, the service provider computer system 110 can provide any of a variety of network accessible services, such as financial management services, email services, news feed services, social networking services, on-line collaboration services, calendar management services, audio and video conferencing services, and shopping services. In response the service provider computer system 110 can transmit content (e.g., web page, text, images, code) to the computing devices 102 and/or 106 that provides the service to the user (404).

The user's computing devices 102 and/or 106 can provide information that identifies web service use by a user of the computing devices 102 and/or 106 to the application marketplace computer system 112 (406). Similarly, information identifying the use of web-based services by users can also be provided to the application marketplace computer system 112 by the service provider computer system 110 (not depicted) and/or the mobile computing device 104 (408). The types of information in the use information provided to the application marketplace computer system 112 can include, for example, the user's history of using web-based application service, web-browsing history, website bookmarks, and/or received emails. Such information may only be provided with prior user consent (e.g., user selection of an option to share use information with the application marketplace computer system 112).

The application marketplace computer system 112 can aggregate use information for a particular user (410). As described above, use information for a particular user can be provided from a plurality of sources associated with a particular user (e.g., a user's desktop computing devices, a user's laptop computing devices, a user's various kinds of mobile computing devices). Using the aggregated use information, the application marketplace computer system 112 can identify the native mobile applications to be recommended to the user (412). The identification of native mobile applications to recommend can be based on a variety of factors, as discussed above with regard to FIGS. 1A-B, 2, and 3A-B. The application marketplace computer system 112 can recommend the identified one or more native applications to the mobile computing device 104 for downloading, use, and/or installation (414). The timing for providing the recommendation (e.g., in response to request from the mobile computing device 104, as content included in a user interface for the application marketplace) and the form of the recommendation (e.g., push notification, auto-installation of recommended application) can be provided in any of a variety of ways, as discussed above with regard to FIGS. 1A-B, 2, and 3A-B.

The mobile computing device 104 can received and process the recommendation from application marketplace computer system 112 (416), and can proceed to provide a notification on the mobile computing device 104 regarding the recommendation (418) and/or to automatically download and/or install the recommendation native application(s) on the mobile computing device 104 (420). For example, the mobile computing device 104 can provide the notification 145, can automatically install a recommended native application and place the icon 147 for the application in the designated area 147 for new recommended applications, and/or can provide the notification 182 in association with the promotional offer 184.

Figure 5:
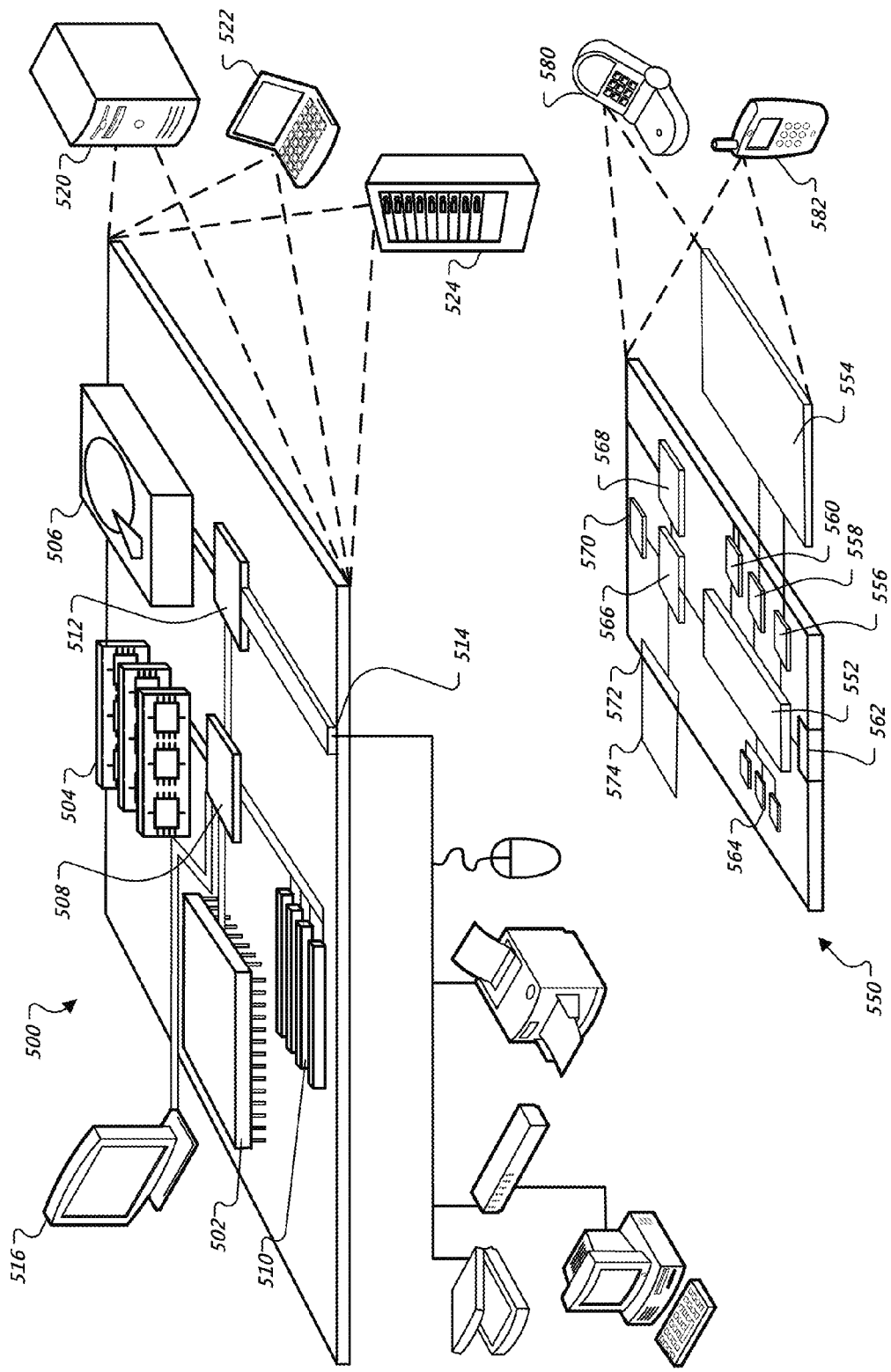
FIG. 5 is a block diagram of example computing devices.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine -readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing native mobile application recommendations may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   identifying, by an application marketplace computer system, a request by a particular user to access a first web page, the request originating from one or more computing devices that are associated with the particular user;
   receiving, by the application marketplace computer system, information that identifies past use of one or more computer-based services by the particular user from one or more computing devices that are associated with the particular user;

identifying, by the application marketplace computer system and based on the request and information that identifies past use, one or more interests of the particular user;

identifying, by the application marketplace computer system and based on the identified one or more interests of the particular user, a native application that is configured to be installed and executed by one or more types of mobile computing devices, further comprising eliminating from consideration any native application that the particular user previously installed and then uninstalled;

determining, by the computer system, whether to recommend the native application; and providing, by the application marketplace computer system based on the determining, a recommendation that is associated with the particular user and that identifies the native application for installation on a particular mobile computing device that is associated with the particular user.

2. The computer-implemented method of claim 1, wherein the information that identifies past use is provided in response to the particular user granting, from at least one of the one or more computing devices that are associated with the particular user, permission to access the information that identifies past use.

3. The computer-implemented method of claim 1, wherein the information that identifies past use includes a web browsing history for the particular user on the one or more computing devices.

4. The computer-implemented method of claim 1, wherein the information that identifies past use includes a number of times the particular user has accessed particular computer-based services over a period of time.

5. The computer-implemented method of claim 1, wherein the information that identifies past use includes information that identifies the duration of time the particular user spent interacting with a particular computer-based service.

6. The computer-implemented method of claim 1, wherein the information that identifies past use is aggregated from more than one of the user's computing devices.

7. A computer-implemented method comprising:
accessing, by an application marketplace computer system, social network information that identifies a plurality of users who have at least a threshold acquaintance relationship on one or more social networks with a particular user;

identifying, by the application marketplace computer system, one or more native applications in the application marketplace that the plurality of users have installed;

identifying, by the application marketplace computer system and based on the identified one or more native applications, a particular native application that each of the plurality of users has installed and that is configured to be installed and executed by one or more types of mobile computing devices; and providing, by the application marketplace computer system a recommendation that is associated with the particular user and that identifies the particular native application for installation on the particular mobile computing device.

8. A computer system for providing recommendations for native mobile applications, the system comprising:

a data collection system that is programmed to access information that identifies past use of one or more computer-based services by a particular user from one or more computing devices that are associated with the particular user;

a native application discovery system that is programmed to identify one or more native applications that are associated with the one or more services, wherein the one or more native applications are configured to be installed and executed by one or more types of mobile computing devices;

a native application selection system that is programmed to determine whether to recommend the one or more native applications based on the information that identifies past use of the one or more computer-based services and a determination of whether the particular user previously installed and then uninstalled the one or more native applications; and a recommendation unit that is programmed to provide, based on the determination by the native application selection system, a recommendation that is associated with the particular user and that identifies at least one of the one or more native applications for installation on a particular mobile computing device that is associated with the particular user.

9. The computer-implemented method of claim 1, further comprising:
receiving information that identifies previous recommendations that were provided to users and information that indicates whether users acted on the recommendation,
wherein identifying the native applications comprises using the received information.

10. The computer-implemented method of claim 1, wherein identifying the native application further comprises identifying a particular type of native application that the particular user has previously installed.

11. The computer-implemented method of claim 1, wherein identifying the native application further comprises identifying use of native applications by an acquaintance of the particular user and using the identified use of native applications by the acquaintance to identify one or more native applications to recommend to the particular user.

12. The computer-implemented method of claim 11, wherein the acquaintance is connected to the particular user in a social network.

13. The computer-implemented method of claim 1, wherein identifying the native application further comprises identifying information from a social graph that indicates one or more native applications used by other users of a social network in which the particular user is a member and using the identified information from the social graph to select the native application.

14. The computer-implemented method of claim 7, wherein using the identified information from the social graph comprises weighting the identified information from the social graph based at least on a strength of social network relationship with a particular acquaintance.

15. The computer-implemented method of claim 1, wherein determining whether to provide the identified native application is based on at least one of a use of web-based services, web browser bookmarks, subscriptions to content feeds, installation and use of native applications by connections on one or more social networks, and actions taken by the particular user in response to previous native application recommendations.

16. The computer-implemented method of claim 1, wherein determining whether to provide the identified native application is based, at least in part, on a frequency of use of the identified native application by acquaintances of the particular user.

17. The computer-implemented method of claim 1, wherein the providing the identified native application comprises providing for display a textual or a graphical representation of the identified native application.

18. The computer-implemented method of claim 1, wherein providing the identified native application further comprises providing an indication of a basis on which the identified native application was identified.

19. The computer-implemented method of claim 7, wherein the recommendation is provider without a request for content from the application marketplace computer system.

20. The computer system of claim 8, wherein the recommendation unit is configured to provide the recommendation without an explicit request for a native application recommendation.

* * * * *